(12) United States Patent
Liu et al.

(10) Patent No.: US 10,034,292 B1
(45) Date of Patent: Jul. 24, 2018

(54) RESOURCE ALLOCATION IN WIRELESS NETWORKS

(71) Applicant: Sprint Spectrum LP, Overland Park, KS (US)

(72) Inventors: Chunmei Liu, Great Falls, VA (US); Krishna Sitaram, Chantilly, VA (US); Hemanth Pawar, Brambleton, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 23 days.

(21) Appl. No.: 15/297,437

(22) Filed: Oct. 19, 2016

(51) Int. Cl.
*H04W 72/04* (2009.01)
*H04B 7/0452* (2017.01)

(52) U.S. Cl.
CPC ........ *H04W 72/046* (2013.01); *H04B 7/0452* (2013.01); *H04W 72/042* (2013.01); *H04W 72/0446* (2013.01)

(58) Field of Classification Search
CPC ........... H04W 72/046; H04W 72/0446; H04W 72/042; H04B 7/0452
See application file for complete search history.

(56) References Cited

U.S. PATENT DOCUMENTS

| 8,954,045 | B2* | 2/2015 | Chhabra | G06F 9/5011 370/236 |
| 9,516,636 | B2* | 12/2016 | Park | H04W 72/14 |
| 2013/0114525 | A1* | 5/2013 | Ahmadi | H04L 5/0053 370/329 |
| 2013/0128820 | A1* | 5/2013 | Yuan | H04W 36/385 370/329 |
| 2013/0242886 | A1 | 9/2013 | Chen et al. | |
| 2013/0315115 | A1* | 11/2013 | Kim | H04J 11/0056 370/280 |
| 2015/0139104 | A1* | 5/2015 | Seo | H04L 5/0053 370/329 |
| 2015/0215061 | A1* | 7/2015 | Tsai | H04J 11/0053 370/328 |
| 2017/0071007 | A1* | 3/2017 | Wang | H04W 28/08 |

* cited by examiner

*Primary Examiner* — Ricky Ngo
*Assistant Examiner* — Lan Huong Truong

(57) ABSTRACT

Allocating resources in a wireless network includes monitoring usage of each of a control channel and a data channel, determining that at least the usage of the data channel exceeds a capacity of the data channel, determining a usage of each of the control channel and the data channel operating in MU-MIMO mode, determining that the usage of the control channel in the MU-MIMO mode exceeds a first capacity of the control channel, determining a usage of each of the control channel and the data channel operating in both the MU-MIMO mode and an enhanced control mode, and adjusting a size of the portion of resources of the data channel allocated for control information upon determining that the second usage of one of the control channel or the data channel exceeds a second capacity of one of the control channel or the data channel.

10 Claims, 6 Drawing Sheets

RESOURCE ALLOCATION IN WIRELESS NETWORKS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks utilize both control channels and data channels. The ratio of resources available to transmit control information in control channels is far lower than resources in the data channel. However, numerous applications such as, for instance, voice-over-LTE (VoLTE), require more control resources for additional signaling, without requiring too many data resources. Moreover, in a multi-user multiple-input-multiple-output (MU-MIMO) mode, the additional wireless devices in such transmission modes require additional control and signaling resources. While enhanced control modes (such as E-PDCCH in LTE networks) are available to minimize resource consumption in control channels, they require additional resources in data channels.

OVERVIEW

Exemplary embodiments described herein include methods and processing nodes for maximizing available resource capacity of a wireless network allocating resources and implementing SU-MIMO, MU-MIMO, and/or enhanced control modes based on resource usage. An exemplary method for allocating resources in a wireless network includes determining that a resource capacity of one of a control channel or a data channel is exceeded, wherein a portion of the data channel is allocated for control information, and adjusting a size of the portion of the data channel allocated for control information.

Another exemplary method for allocating resources in a wireless network includes monitoring a usage of each of a control channel and a data channel, upon determining that at least the usage of the data channel exceeds a capacity of the data channel, determining a first usage of each of the control channel and the data channel operating in a multi-user (MU) MIMO mode, upon determining that the first usage of the control channel in the MU-MIMO mode exceeds a first capacity of the control channel, determining a second usage of each of the control channel and the data channel operating in both the MU-MIMO mode and an enhanced control mode. In the enhanced control mode, a portion of resources of the data channel is allocated for control information. The method further includes adjusting a size of the portion of resources of the data channel allocated for control information upon determining that the second usage of at least one of the control channel or the data channel exceeds a second capacity of said at least one of the control channel or the data channel.

An exemplary system for allocating resources in a wireless network includes a processing node, and a processor coupled to the processing node. The processor enables the processing node to perform operations including determining that a first resource capacity for one of a data channel and a control channel in a single-user (SU) MIMO mode is exceeded by a first resource usage, implementing a multi-user (MU) MIMO mode upon determining that the first resource capacity for the data channel is exceeded, implementing an enhanced control mode upon determining that the first resource capacity for the control channel is exceeded, wherein in the enhanced control mode, a portion of resources of a data channel are allocated for control information, and balancing one or both of a number of wireless devices operating in the MU-MIMO mode or the portion of resources of the data channel allocated for control information based on a second resource capacity and second resource usage for the data channel and the control channel.

DETAILED DESCRIPTION

In embodiments disclosed herein, an available resource capacity of a wireless network is maximized by implementing a single-user multiple-in multiple-out (SU-MIMO) mode, a multi-user (MU-MIMO) mode, and an enhanced control mode, in various combinations. In the SU-MIMO mode, multiple data streams are directed towards individual wireless devices. In the MU-MIMO mode, the multiple data streams can be directed towards plural wireless devices that are selected to participate in the MU-MIMO mode based on the orthogonality of transmission, thereby maximizing resources as further described herein. In the enhanced control mode, a portion of resources generally allocated for data transmission are, instead, allocated for control information. This reduces the usage of the control channel, particularly when resource usage of the control channel is higher than resources available within the control channel. The allocation of resources described herein may be performed by allocating physical resource blocks (PRBs) within a subframe. As further described herein, the subframe can comprise a dedicated portion of PRBs allocated for control information, i.e. a control channel, and another dedicated portion of PRBs allocated for data transmission, i.e. a data channel. In embodiments implemented within long-term evolution (LTE) or LTE-Advanced (LTE-A) networks, the control channel may be referred to as PDCCH, the data channel may be referred to as PDSCH, and the enhanced control mode may be referred to as E-PDCCH. Balancing RB allocations as described herein is enabled by periodic and/or constant determination of PRBs available in both the control channel and the data channel, as well the usage thereof by wireless devices in the network. For example, resource availability and usage determinations and allocation operations described herein may be performed at defined time intervals such as every transmission-time-interval (TTI), every 10 ms, every 1 s, etc. In embodiments described herein, an access node that deploys wireless resources (i.e. an air interface), or a processing node on the wireless network, can be configured to schedule resources using the various modes described above. These and additional operations are further described with respect to the embodiments depicted in FIGS. 1-7 below.

Figure 1:
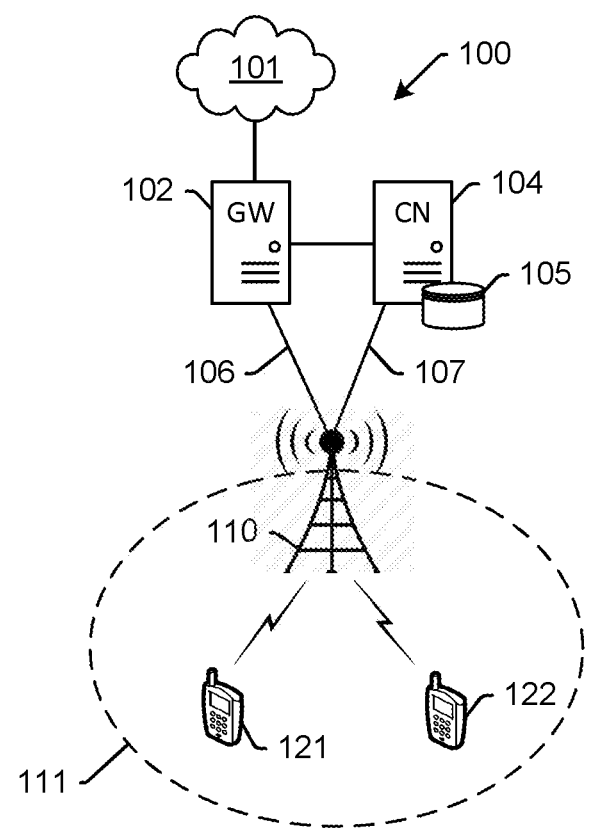
FIG. 1 depicts an exemplary system for allocating resources in a wireless network.

FIG. 1 depicts an exemplary system 100 for transmitting cell-specific reference signals. System 100 comprises a communication network 101, gateway 102, controller node 104, access node 110, and wireless devices 121, 122. Access node 110 is illustrated as having a coverage area 111, with wireless devices 121, 122 being located within coverage area 111 and accessing network services from access node 110. Access node 110 can be any network node configured to provide communication between end-user wireless devices 121, 122 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an exemplary embodiment, a macrocell access node can have a coverage area 111 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. By virtue of comprising a plurality of antennae as further described herein, access node 110 can deploy or implement multiple-input-multiple-output (MIMO) modes, such as single user MIMO (SU-MIMO) or multi-user MIMO (MU-MIMO) modes. In operation, access node 110 (or any other network node in system 100) can be configured to maximize an available resource capacity of system 100 by implementing a SU-MIMO mode, a MU-MIMO mode, and an enhanced control mode, in various combinations, wherein in the enhanced control mode, a portion of resources generally allocated for data transmission are allocated for control information. Moreover, it is noted that while access node 110 is illustrated in FIG. 1, any number of access nodes can be implemented within system 100.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access nodes 110 may communicate with other access nodes (not shown) using a direct link such as an X2 link or similar.

Wireless devices 121, 122 may be any device, system, combination of devices, or other such communication platform capable of communicating wirelessly with access node 110 using one or more frequency bands deployed therefrom. Wireless devices 121, 122 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to wireless devices 121, 122, such as control information, location, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
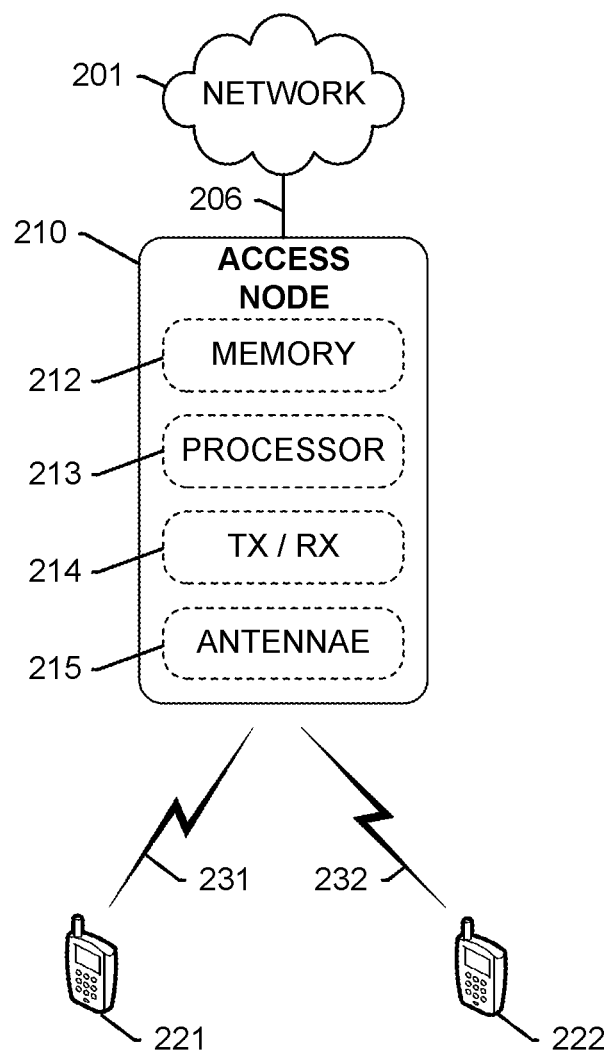
FIG. 2 depicts an exemplary access node allocating resources in a wireless network.

FIG. 2 depicts an exemplary access node 210 for allocating resources in a wireless network. Access node 210 is configured as an access point for providing network services from network 201 to end-user wireless devices 221, 222 via communication links 231, 232 respectively. Access node 210 is illustrated as comprising a memory 212 for storing logical modules that perform operations described herein, a processor 213 for executing the logical modules, and a transceiver 214 for transmitting and receiving signals via antennae 215. Although only one transceiver is depicted in access node 210, additional transceivers may be incorporated in order to deploy MIMO modes with wireless devices 221, 222, and to facilitate communication with other network nodes on network 201. Further, access node 210 is communicatively coupled to network 201 via communication interface 206, which may be any wired or wireless link as described above.

In operation, memory 212 comprises one or more logical modules that are executed by processor 213 to enable access node 210 to maximize an available resource capacity by monitoring or determining usage of resource blocks (PRBs) dedicated towards transmission of data and control information to and from wireless devices 221, 222 by links 231, 232 respectively, and implementing the various communication modes described herein. For example, in an SU-MIMO mode, multiple data streams are directed individually towards wireless devices 221, 222. In the MU-MIMO mode, the multiple data streams can be directed towards wireless devices 221, 222 using the same frequency band, based on the orthogonality of links 231, 222. In the enhanced control mode, a portion of resources generally allocated for data transmission are, instead, allocated for control information as further described herein. Determinations of usage and available capacity of PRBs in each transmission mode may be based on a known resource requirement of each wireless device 221, 222, and resources available in each transmission mode. For example, a scheduler module within memory 212 may allocate PRBs within a subframe comprising a first dedicated portion of PRBs allocated for control information, i.e. a control channel, and a second dedicated portion of PRBs allocated for data transmission, i.e. a data channel. Depending on the usage and available capacity, each mode is implemented independently or in combination, allocations of resources are dynamically allocated between data transmission and control information transmission, and different wireless devices are included or excluded from MU-MIMO operation. Moreover, these operations may be performed at defined time intervals such as every transmission-time-interval (TTI), every 10 ms, every 1 s, etc., thereby providing sufficient time for changes caused by switching transmission modes to be realized in the network.

Figure 3:
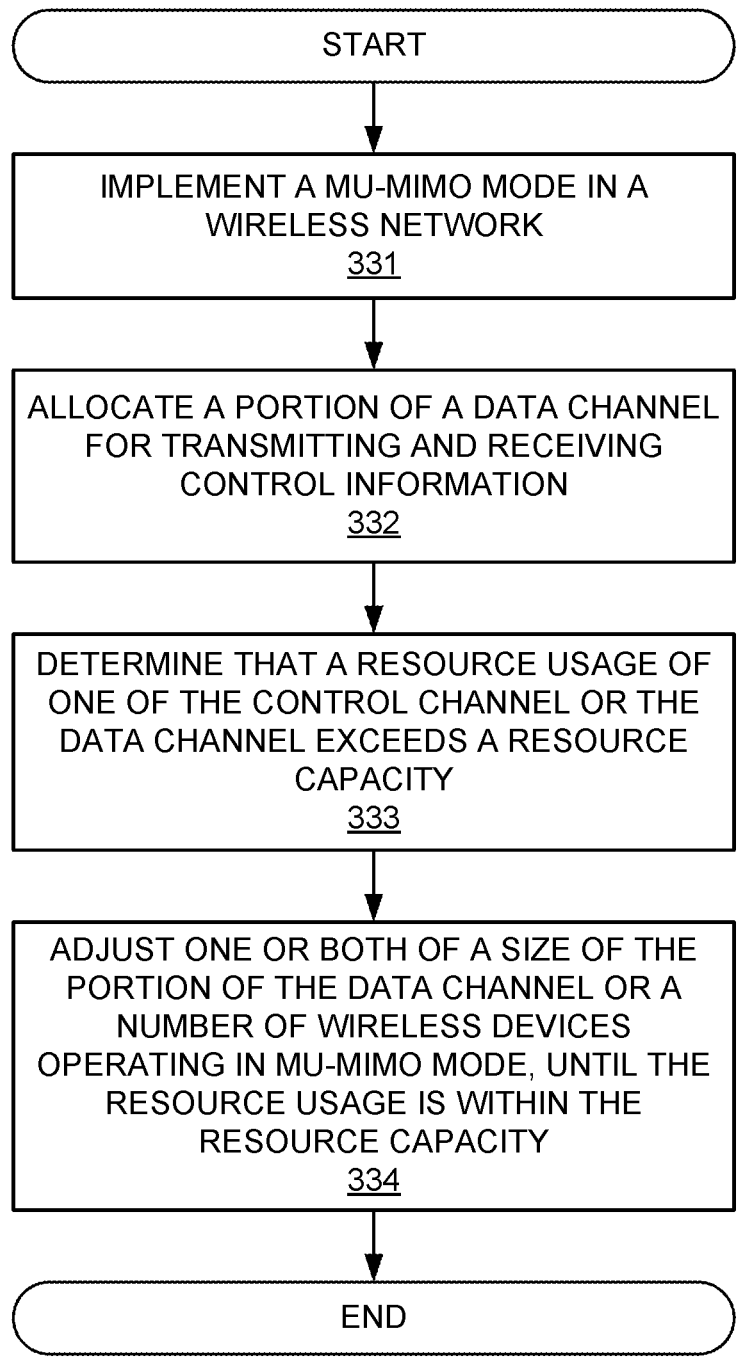
FIG. 3 depicts an exemplary method for allocating resources in a wireless network.

FIG. 3 depicts an exemplary method for allocating resources in a wireless network. The method of FIG. 3 is illustrated with respect to an access node. In other embodiments, the method can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 331, a MU-MIMO mode is implemented in a wireless network. The MU-MIMO mode may be implemented upon determining that a demand or usage of resources is higher than available resources in the wireless network. For example, the wireless network may be operating in SU-MIMO mode, whereby data streams are transmitted to and from the individual wireless devices. It may be determined that upon switching to MU-MIMO, the same set of resources can be used to transmit data streams to and from different wireless devices using the same set of resources, thereby increasing overall spectral efficiency in the air interface deployed by the access node. For example, two wireless devices can be paired, and share the same set of resource blocks for downlink and uplink transmission. This requires orthogonality between the two transmissions, which can be achieved by assigning cyclic shifts allocated to the Demodulation Reference Signals (DM-RS) to differentiate the parallel streams received at the access node or plurality of antennae thereof.

Further, at 332, a portion of the data channel (used to transmit and receive data streams) may be allocated for control information. Generally and as described herein, a set of PRBs is dedicated towards control information, and is typically referred to as a control channel. Resources dedicated to the control channel are usually fixed, and significantly fewer than resources available for data transmission. E-PDCCH is useful when it is necessary to increase control resources, for instance, when there are several wireless devices in the network, or when cross-carrier scheduling is required for carrier aggregation. In some embodiments, the additional wireless devices operating in MU-MIMO mode (as implemented in step 331) require additional control channel resources for transmitting control information, such as control signals. E-PDCCH can be implemented upon determining that these additional control resources overwhelm the available resources in the control channel. In some embodiments, E-PDCCH can be scheduled to occupy only a portion of the resources within a particular frequency of the downlink shared channel (PDSCH in LTE networks), so as to avoid affecting the data transmissions to and from the legacy devices using the particular frequency.

At 333, it is determined that a resource usage of one or more of the control channel or the data channel exceeds a resource capacity of the channel. As described herein, determinations of usage and available capacity of PRBs in each transmission mode are performed on a periodic or ongoing basis. For example, in the current transmission mode, i.e. a combination of MU-MIMO and enhanced control (i.e. E-PDCCH) modes as performed in steps 331 and 332, more resources may be required for additional control information than are available in the control channel. Alternatively or in addition, more data resources may be required than are available in the data channel.

Thus, at 334, a scheduler module on an access node (or any other logical module on a suitable network element) can adjust either (or both) of a size of the control resource allocation, or a number of wireless devices operating in MU-MIMO mode, in an effort to maximize available resources in at least one if not both channels. Each adjustment (control resources and number of MU-MIMO devices) affects resource usages of each channel differently, and may be implemented in different combinations. For example, increasing the size or number of resources (e.g., PRBs) allocated for control information in the data channel (i.e. enhanced control or E-PDCCH mode) increases available resources in the control channel, while reducing resources in the data channel. Adding wireless devices into MU-MIMO mode increases available resources in the data channel, and can potentially increase usage of resources (i.e. reduce available resources) in the control channel. It should be noted that, when MU-MIMO mode is enabled while enhanced control mode is disabled, adding wireless devices operating in MU-MIMO mode increases the requirement for control signals. When enhanced control mode is enabled, adding wireless devices may not affect the control channel, as in MU-MIMO mode control information uses the data channel.

Adjustments 334 may be performed until resources are optimized. In one exemplary embodiment, resources are optimized when resource usage for both channels is within capacity (i.e. available resources). In another embodiment, resources are optimized when the maximum amount of data is transmitted and there are available resources in the control channel. Other combinations of factors for optimized resource usage will be evident to those having ordinary skill in the art, in light of this disclosure. In some embodiments (as described below), a timer may be implemented to trigger determination of resource usage vs. availability and balancing operations resulting therefrom.

Figure 4:
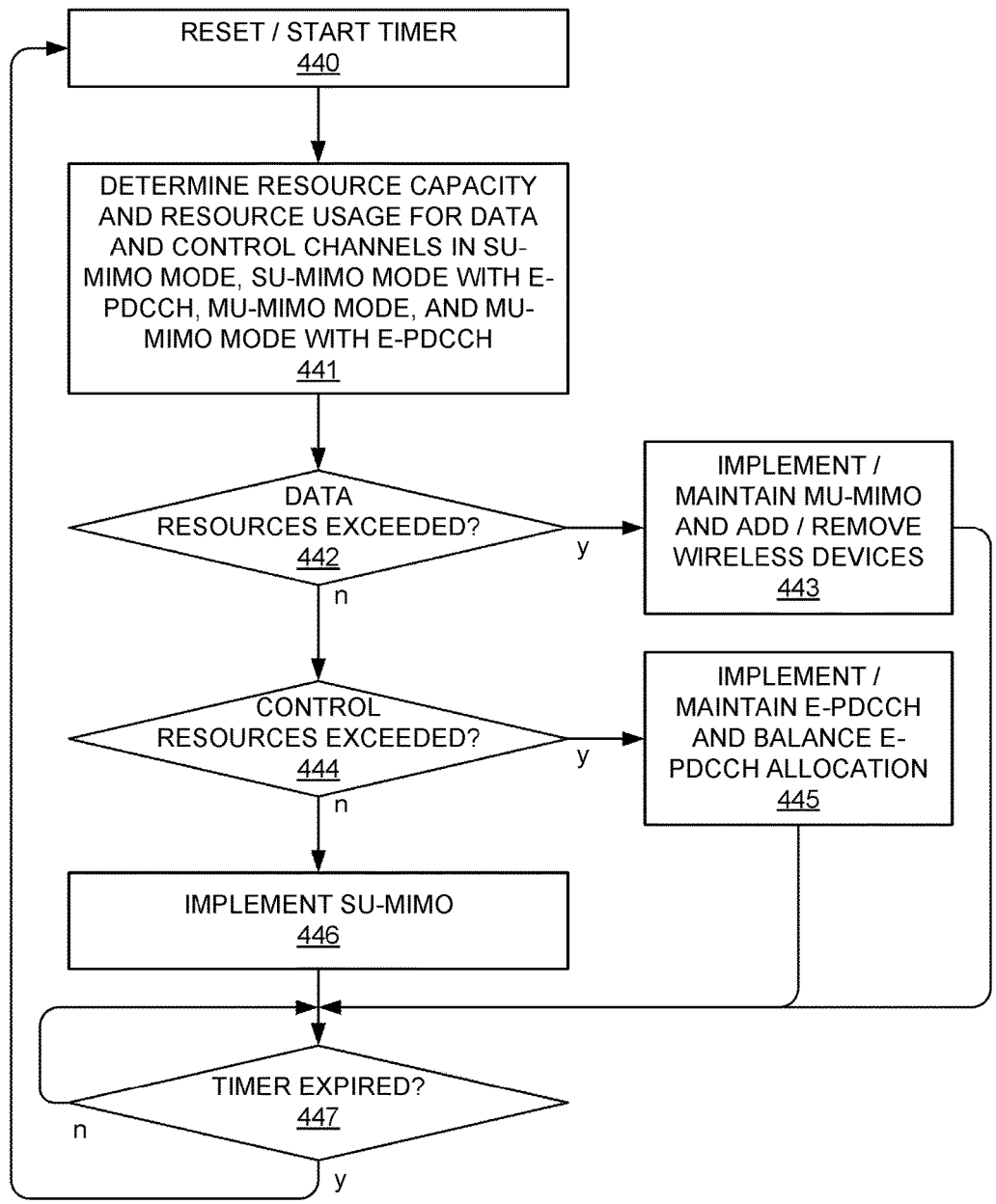
FIG. 4 depicts another exemplary method for allocating resources in a wireless network.

FIG. 4 depicts another exemplary method for allocating resources in a wireless network. The method of FIG. 4 is illustrated with respect to a scheduler module within or communicatively coupled to an access node. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways The method begins at 440 with the initiation of a timer. In conjunction with determination of timer expiration at 447, this loop enables various comparisons of resource capacity vs resource usage for a data channel and a control channel operating in a plurality of different transmission modes. Then, at 441, a resource capacity and resource usage is determined for the data channel and the control channel in each transmission mode. Each transmission mode may result in different amounts of capacity and usage, depending on the number, type, and requirements of wireless devices in the network. Thus, the determination of a plurality of capacities and resources can be performed. For example, a determination (or measurement) is made of resources available in the data channel, data channel resources required by, for instance, wireless devices transmitting and receiving data streams across the air interface, resources available in the control channel, and control channel resources required for control information, for each of a SU-MIMO and an MU-MIMO transmission mode. Moreover, an amount of data channel resources used by control information (in enhanced control mode) is also determined for each of the SU-MIMO and MU-MIMO modes. Determination 441 may be performed hypothetically, i.e. simulating resource capacity and usage based on the known availability of PRBs in the network, and the requirements of wireless devices connected thereto. Alternatively, determination 441 may be performed via real-time or reported measurement of each type of usage and availability upon implementing each transmission mode in the network.

In operations 442-447, a plurality of determinations is made whether or not a resource capacity meets a resource usage for each transmission mode. For instance, at 442, it is determined whether or not resource usage exceeds resource capacity in the data channel. If yes, then MU-MIMO is implemented at 443 to pair wireless devices having orthogonality, and to conserve resources in the data channel. The implementation of MU-MIMO at 443 may be performed from an SU-MIMO mode. Alternatively, MU-MIMO may have already been implemented, and is simply maintained, in which case wireless devices may be removed or added to the MU-MIMO mode to maximize available resources, as further described above with respect to FIG. 3. Upon implementing/maintaining MU-MIMO at 443, the method can await timer expiration at 447, upon which fresh determinations 441 of resource availability and usage are performed to determine whether or not data resources are exceeded at 442 or control resources are exceeded at 444. For instance, if the data resources are not exceeded by usage, it is determined whether or not control information usage exceeds resource capacity in the control channel at 444. If control resources are overwhelmed, then E-PDCCH is implemented (or maintained) at 445, and the E-PDCCH allocation is balanced to maximize resource availability. The balancing may include, for example, adjustment of wireless devices in as described above and with reference to FIG. 3. It should be noted that the order of steps 442-443 and 444-445 may be reversed, i.e. steps 444 and 445 may be performed prior to steps 442-443, such that E-PDCCH may be implemented to maximize control resources while the network is operating in SU-MIMO mode, and MU-MIMO mode subsequently implemented upon determining (after timer expiration 447) that, while control resources have become available, data resources are exceeded.

If it is determined by steps 442, 444 that neither data nor control resources are exceeded, then the method implements SU-MIMO at 446, and awaits timer expiration at 447. Although step 446 is performed upon determining that neither resources are exceeded, such determination may be limited to resource availability in SU-MIMO mode. In other words, it is possible that using SU-MIMO mode caused resource usage to exceed resource availability in the first place. Thus, upon timer expiration 447 if it is determined again at 442-444 that resources in either channel are exceeded, then step 446 may be optional. For example, if reverting to SU-MIMO causes resource usage to exceed available resources a threshold number of times, then step 446 is removed from the method, or subject to a second timer that is longer than the timer in steps 440, 447. In other embodiments, comparison steps 442, 444 may utilize the available resources and resource usage for the particular mode being implemented, thereby enabling intelligent decisions of whether or not to implement MU-MIMO, E-PDCCH, or SU-MIMO in various combinations. Moreover, all determinations described with respect to FIG. 4 may be based either on actual implementations of each transmission method, or theoretical/hypothetical determinations. In other words, using the known availability of PRBs in the network for each transmission mode, and the requirements of wireless devices in each transmission mode (such as a modulation and coding scheme, application requirement, device type, etc.), the operations described herein may be performed with theoretical or simulated values to determine the optimal transmission mode prior to implementing said transmission mode. The optimal transmission mode may be any transmission mode that maximizes available resources while also maximizing data throughput, i.e. data transferred in the data channel.

Figure 5:
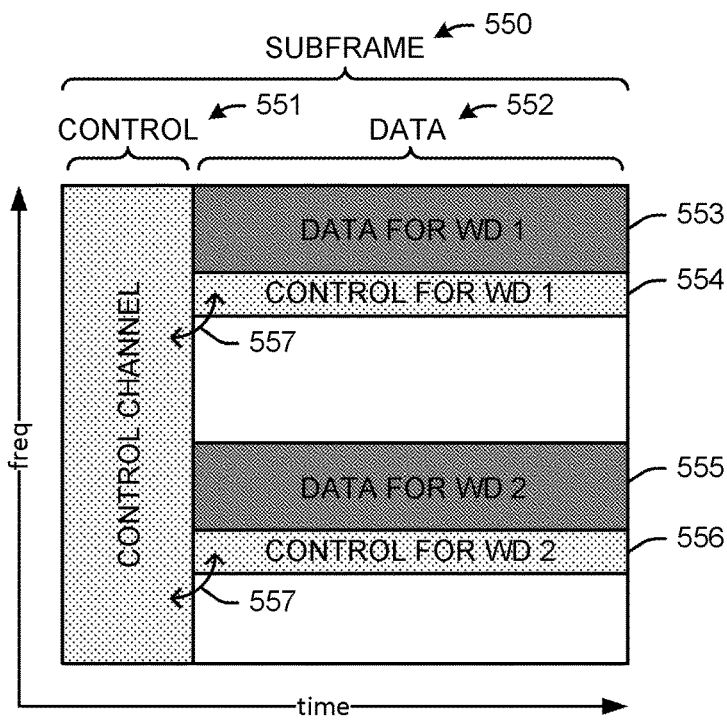
FIG. 5 depicts an exemplary subframe with resources allocated for a plurality of wireless devices.

FIG. 5 depicts an exemplary subframe 550 with resources allocated in a control portion 551 and a data portion 552 for a plurality of wireless devices. While not shown in FIG. 5 but known to those of ordinary skill in the art, subframe 550 may include, for example, a number of OFDM symbols in the time domain and a number of subcarrier frequencies (aka, subcarriers) in the frequency domain. An OFDM symbol in time and a subcarrier in frequency together may define a resource element (RE). A physical resource block (PRB) may be defined, for example, in LTE networks, as 12 consecutive subcarriers in the frequency domain and all the OFDM symbols in a slot in the time domain. PRBs can be used, for example, to describe the mapping of certain physical channels to resource elements.

In this example, resources (e.g. PRBs) within control portion 551 may be allocated for control information such as, for example, downlink (DL) or uplink (UL) data scheduling information, or grants, from an access node to one or more wireless devices. The scheduling information may include, for example, a resource allocation, a modulation and coding rate (or derived from transport block size), the identity of the intended wireless device(s), and other information. Additional control information such as the PCFICH (physical control format indicator channel), PHICH (physical HARQ (hybrid automatic repeat request) indicator channel), and PDCCH may be transmitted using control portion 551 of subframe 550. Control portion 551 may include, for example, the first few OFDM (orthogonal frequency division multiplexing) symbols in subframe 550. The exact number of OFDM symbols for the control portion 551 may be either dynamically indicated by PCFICH, which may be transmitted in the first symbol, or semi-statically configured in the case of carrier aggregation in LTE Rel-10, for example.

Control information in control portion 551 may be intended, for example, for a single wireless device, multiple wireless devices or all wireless devices in a cell, depending on the nature and content of the scheduled data. A broadcast control channel may be used, for example, to carry scheduling information for data portion 552, which allocates resources for a physical downlink shared channel (PDSCH) intended to be received, for example, by all wireless devices in a cell, such as system information about the access node. A multicast control channel (e.g. PDCCH) may be intended, for example, to be received by a group of wireless devices in a cell. A unicast control channel may be used, for example, to carry scheduling information for a data that is intended to be received by only a single wireless device, such as data 553 for wireless device 1 (WD1), or data 555 for wireless device 2 (WD2).

Data channels such as PDSCH, PBCH (physical broadcast channel), PSS/SSS (primary synchronization signal/secondary synchronization signal), and CSI-RS (channel state information reference signal) may use resources from data portion 552. DL user data may be carried by the PDSCH channels scheduled in data portion 552. Cell-specific reference signals may be transmitted over both the control portion 551 and data portion 552. Moreover, in an enhanced control mode (such as, for instance, E-PDCCH), control information 554 and 556 for WD1 and WD2 respectively may use resources in the data channel. For example, a current capacity of control portion 551 of subframe 550 may not be enough to support a large number of wireless devices in a cell. Downlink control information (DCI) may thus be transmitted using resources in data portion 552. In other words, resources 554 and 556 may be reserved for DCI transmission and other control information related to WD1 and WD2, respectively. In LTE systems, the set of PRBs and OFDM symbols reserved for this purpose may be referred to as an E-PDCCH region. E-PDCCH regions 554, 556 may not necessarily be completely filled with E-PDCCHs in that any resources in the E-PDCCH region not used for E-PDCCH transmission may be, for example, assigned for PDSCH or legacy data transmission.

Moreover, as described herein, determinations of usage and available capacity of PRBs in each transmission mode are performed on a periodic or ongoing basis. In response to determining that control resources 551 or data resources 552 are overwhelmed by usage or requirements of wireless devices, a size of the control resource allocations 554, 556 may be adjusted in an effort to maximize available resources in at least one if not both channels. For example, increasing the size or number of PRBs allocated for control information 554, 556 increases available control resources 551, while reducing data resources 552. Conversely, reducing the size or number of PRBs allocated for control information 554, 556 reduces available control resources 551, while increasing data resources 552. Arrows 557 depict adjustments of resource allocation for control information. Adjustments 557 may be performed until resources are optimized.

Figure 6:
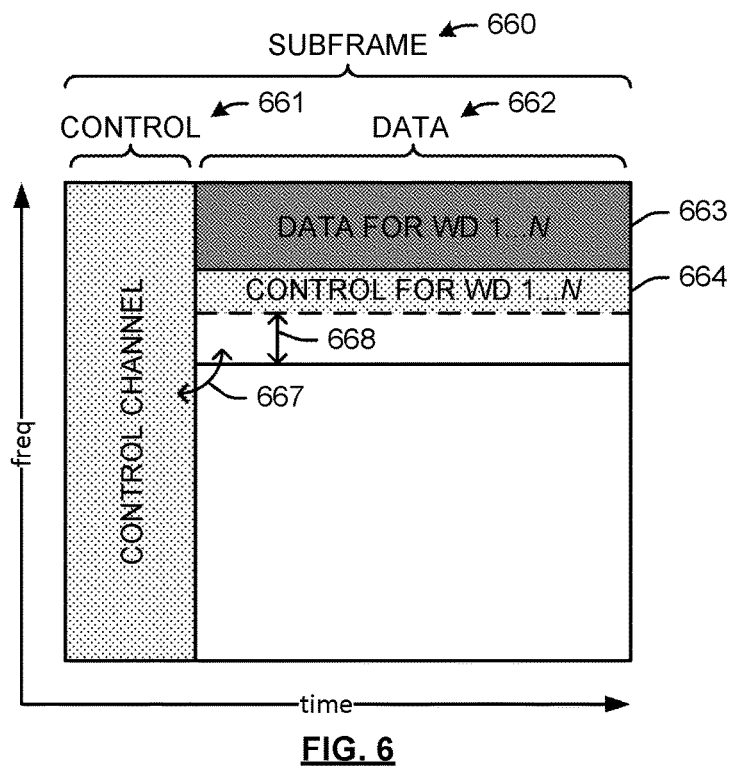
FIG. 6 depicts an exemplary subframe with resources allocated for a plurality of wireless devices operating in MU-MIMO mode.

FIG. 6 depicts an exemplary subframe with resources allocated in a control portion 661 and a data portion 662 for a plurality of wireless devices operating in MU-MIMO mode. In MU-MIMO mode, control information 664 for a plurality of wireless devices may be interleaved and assigned on a same set of time-frequency resources. For example, multiple E-PDCCHs can be cross-interleaved before being transmitted on one or several PRBs. Moreover, as described herein, determinations of usage and available capacity of PRBs in each transmission mode are performed on a periodic or ongoing basis. In response to determining that control resources 661 or data resources 662 are overwhelmed by usage or requirements of wireless devices, a size of the control resource allocations 664 or a number of wireless devices operating in MU-MIMO mode may be adjusted, in an effort to maximize available resources in at least one if not both channels. Each adjustment (control resources and number of MU-MIMO devices) affects resource usages of each channel differently, and may be implemented in different combinations. For example, increasing the size or number of PRBs allocated for control information 664 increases available resources in the control portion 661, while reducing resources in the data portion 662. Further, adding wireless devices into MU-MIMO mode increases available resources in data portion 662, as data 663 for multiple wireless devices having orthogonality can be assigned on the same frequency, thereby increasing usage of data resources 662. Consequently, removing wireless devices from MU-MIMO mode may reduce available resources in data portion 662, as data 663 for multiple wireless devices would need to use additional resources as depicted for WD1 and WD2 in FIG. 5. It should be noted that, when MU-MIMO mode is enabled while enhanced control mode is disabled, adding wireless devices operating in MU-MIMO mode increases the requirement for control signals. When enhanced control mode is enabled, adding wireless devices may not affect the control channel, as in MU-MIMO mode control information uses the data channel. Adjustments 667 and 668 for allocation of control resources in the data channel, as well as removing and adding wireless devices 1 . . . N from MU-MIMO mode, are performed until resources are optimized as described above.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 210, controller node 107, and/or network 101.

Figure 7:
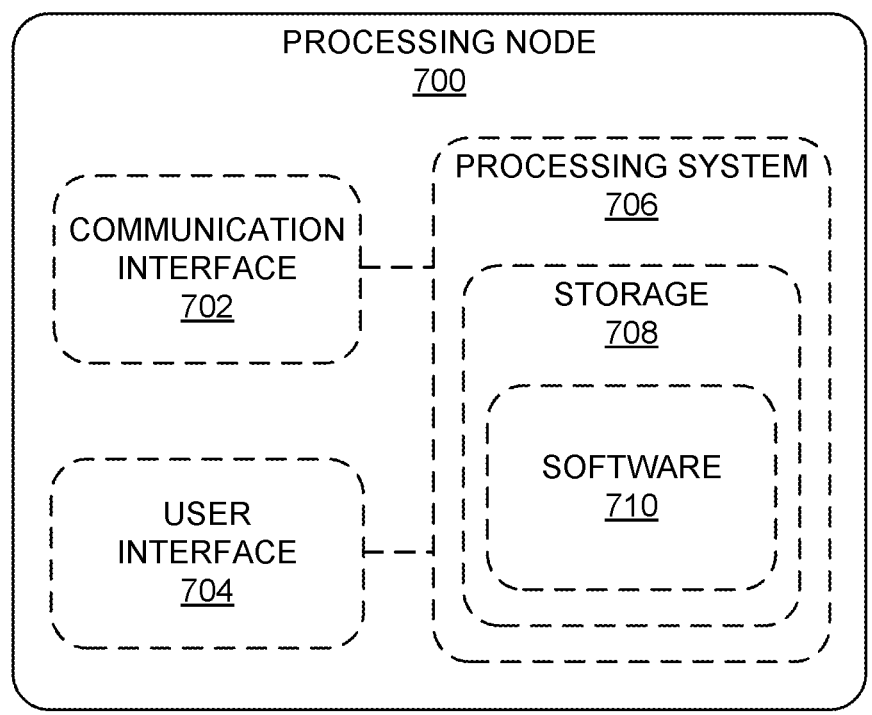
FIG. 7 depicts an exemplary processing node for allocating resources in a wireless network.

FIG. 7 depicts an exemplary processing node for data transmission using frame reconfiguration comprising a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a coherence determination module. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for allocating resources in a wireless network, the method comprising:
monitoring a usage of each of a control channel and a data channel;
upon determining that at least the usage of the data channel exceeds a capacity of the data channel, determining a first usage of each of the control channel and the data channel operating in a multi-user (MU) MIMO mode;
upon determining that the first usage of the control channel in the MU-MIMO mode exceeds a first capacity of the control channel, determining a second usage of each of the control channel and the data channel operating in both the MU-MIMO mode and an enhanced control mode, wherein in the enhanced control mode, a portion of resources of the data channel is allocated for control information;

upon determining that the second usage of at least one of the control channel or the data channel exceeds a second capacity of said at least one of the control channel or the data channel, adjusting a size of the portion of resources of the data channel allocated for control information; and upon determining that the first usage of each of the control channel and the data channel in the MU-MIMO mode does not exceed the first capacity of said each channel, implementing the MU-MIMO mode.

2. The method of claim 1, further comprising initiating a single-user (SU) MIMO mode upon determining that the usage of each of the data channel and the control channel does not exceeds a capacity of said each channel.

3. The method of claim 1, further comprising implementing the enhanced control mode upon determining that the second usage of each of the control channel and the data channel operating in both the MU-MIMO mode and the enhanced control mode does not exceed the second capacity of said each channel.

4. The method of claim 3, wherein the adjusting the size of the portion of the data channel allocated towards control signals is performed until the second usage of each of the control channel and the data channel operating in both the MU-MIMO mode and the enhanced control mode does not exceed the second capacity of said each channel.

5. The method of claim 1, wherein the first usage, first capacity, second usage, and second capacity are simulated based on one or more of a modulation and coding scheme, application requirement, or device type of a wireless device.

6. The method of claim 1, wherein the monitoring is repeated after expiration of a timer.

7. The method of claim 6, wherein the timer comprises a duration of a transmission time interval.

8. A system for allocating resources in a wireless network, the system comprising:

a processing node; and a processor coupled to the processing node, the processor for enabling the processing node to perform operations comprising:

determining that a first resource capacity for one of a data channel and a control channel in a single-user (SU) MIMO mode is exceeded by a first resource usage;

upon determining that the first resource capacity for the data channel is exceeded, implementing a multi-user (MU) MIMO mode;

upon determining that the first resource capacity for the control channel is exceeded, implementing an enhanced control mode, wherein in the enhanced control mode, a portion of resources of a data channel are allocated for control information; and adjusting a number of wireless devices operating in the MU-MIMO mode or the portion of resources of the data channel allocated for control information based on a second resource capacity and second resource usage for the data channel and the control channel, wherein adjusting the number of wireless devices operating in the MU-MIMO mode comprises increasing the number of wireless devices to increase the second resource capacity of the data channel.

9. The system of claim 8, wherein adjusting the portion of resources of the data channel allocated for control information comprises increasing the portion of resources to increase the second resource capacity of the control channel.

10. The system of claim 8, further comprising initiating or maintaining the SU-MIMO mode upon determining that the first usage does not exceed the first capacity.

* * * * *